March 17, 1959 T. L. LEMING ET AL 2,878,454

PIEZOELECTRIC CRYSTAL FILTER

Filed Sept. 3, 1953

INVENTORS
Thomas L. Leming
Louis A. Dick
BY Norman L. Mueller
Atty.

United States Patent Office 2,878,454

Patented Mar. 17, 1959

2,878,454

PIEZOELECTRIC CRYSTAL FILTER

Thomas L. Leming, Redwood City, Calif., and Louis A. Dick, Park Ridge, Ill., assignors to Motorola, Inc., Chicago, Ill., a corporation of Illinois Application September 3, 1953, Serial No. 378,295

4 Claims. (Cl. 333—72)

This invention relates generally to circuits including piezo-electric crystal units for controlling the frequency response thereof, and more particularly to crystal filter circuits wherein the frequency of the crystal is varied by applying physical pressure to change a dimension thereof.

Piezo-electric crystals made of quartz and other materials have been used in electrical circuits as frequency controlling elements because of the very high accuracy of frequency control provided thereby. Because the resonance characteristics of such crystals are very sharp, they have been used in filter circuits to provide a very accurately controlled bandpass or other filter characteristic. Although it is possible to provide such crystals at any desired frequency, to provide great accuracy results in increased cost, and in many applications it may be desired to shift the frequency of the crystal after it is placed in the circuit. In crystal filters, for example, in order to provide a particular filter characteristic it may be desired to shift the resonance frequency of a crystal used in the filter.

It is therefore an object of the present invention to provide an improved system for changing the frequency characteristic of a piezo-electric crystal.

A further object of the invention is to provide a system for changing the frequency characteristics of a piezo-electric crystal by applying mechanical pressure to the crystal to change one of the dimensions thereof.

A feature of this invention is the provision of a circuit including a piezo-electric crystal for affecting the frequency response thereof with mechanical means engaging the crystal and applying force thereto to change a dimension of the crystal to thereby vary the frequency characteristics of the crystal and of the circuit.

A further feature of this invention is the provision of a crystal filter circuit wherein the response of the filter is controlled by a piezo-electric crystal, and in which the holder for the crystal provides means for applying variable pressure thereto for aligning the filter. As an example, the circuit may include two crystals for providing a bandpass characteristic with the bandwidth depending upon the relative difference in frequency of the crystals with respect to each other, and being adjustable by adjustment of the crystal holder to change the frequency response of one crystal.

Further objects, features and the attending advantages of the invention will be apparent from a consideration of the following description when taken in connection with the accompanying drawings in which.

In practicing the invention there is provided an electronic circuit wherein a piezo-electric crystal is used to affect the frequency response of the circuit. The circuit may be of the passive type acting as a filter. The crystal is mounted in a holder so that physical force may be exerted on the crystal to vary the frequency response thereof. When used as a filter circuit, an adjustable static pressure may be exerted on the crystal to compress the same and change the frequency thereof for aligning the filter. The filter may be of the bandpass type including two crystal units operating at slightly different frequencies to provide a wider band than that provided by a single crystal. By adjusting the frequency of one crystal, the bandwidth can be controlled within predetermined limits to vary the filter response.

Figure 1:
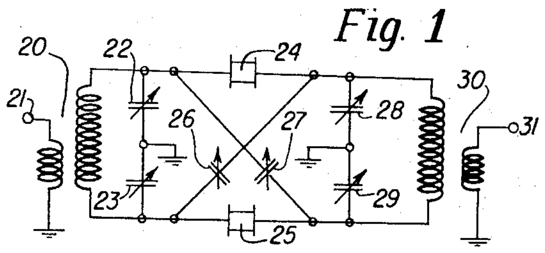
Fig. 1 illustrates a crystal filter circuit.
Figure 2:
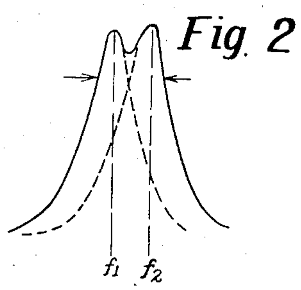
Fig. 2 is a curve showing the response of the circuit of Fig. 1.

Referring now to the drawings, in Fig. 1 there is shown a crystal filter circuit including input transformer 20 to which signals are applied from terminal 21. Signals from the transformer are applied to the balanced condensers 22 and 23 having the common terminal thereof grounded. Connected to the condensers 22 and 23 are crystals 24 and 25 and diagonal condensers 26 and 27 which are in turn connected to output condensers 28 and 29, also having their common connection grounded. Output transformer 30 has its primary winding connected across the condensers 28 and 29 and its secondary connected to the output terminal 31 at which the output of the filter is derived. Fig. 2 illustrates the bandpass characteristics of the filter of Fig. 1 and shows that by tuning the crystals 24 and 25 to slightly different frequencies *f1* and *f2* the bandpass of the filter can be made wider than that produced by a single crystal. To accurately control the width of the band, the frequency of one of the crystals 24 or 25 can be varied. In Fig. 2 the amplitude of the peaks is shown slightly different, and this may be caused by crystals having slightly different characteristics. However, the system can be completely balanced so that the amplitudes are the same.

Figure 3:
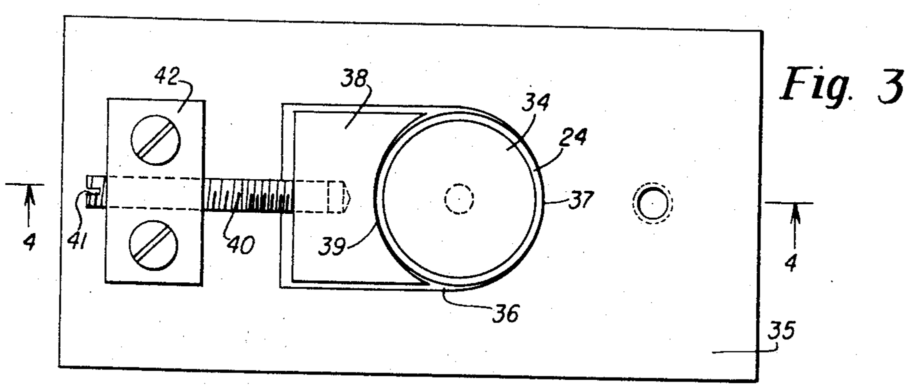
Fig. 3 is a top view of a crystal holder for compressing a crystal to adjust the frequency thereof.
Figure 4:
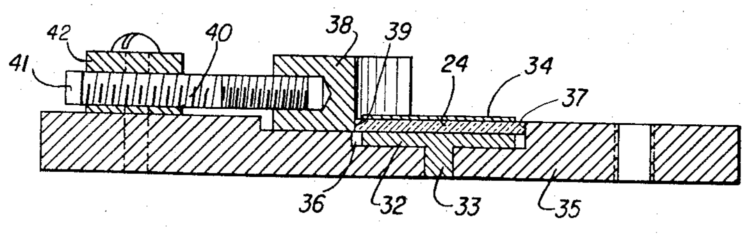
Fig. 4 is a cross-sectional view of the crystal holder along lines 4—4 of Fig. 3.

In order to slightly adjust the resonant frequency of the crystal 24, this crystal may be provided in a holder as shown in Figs. 3 and 4. The crystal may be of circular configuration in the form of a disc. The holder is formed by a base 35 having a recess 36 therein to receive the crystal 24. The crystal rests on electrode 32 having a portion 33 extending through the base 35. A second electrode 34 is provided on the top side of the crystal 24. One edge 37 of the recess is curved to conform generally to the edge of the crystal, although having a slightly larger diameter. The crystal holder includes adjustable jaw 38 having a curved edge 39 engaging the edge of the crystal 24 opposite to that engaged by the curved edge 37. The jaw 38 is supported by the rod 40 which is threaded both into the jaw 38 and the block 42. The rod 40 may include a slotted end 41 to receive a screwdriver or the like to facilitate rotating the same to adjust the position of the jaw 38. Two sets of thread having slightly different pitch may be provided so that the movement of the jaw 38 resulting from rotation of the rod 40 is very slow. Accordingly, the amount of squeeze applied to the crystal 24 can be very carefully controlled, and this in turn provides a carefully controlled variation of the frequency of the crystal.

Although the actual change in the dimension of the crystal is very small, the pressure applied thereto causes stresses and strains in the crystal which change the electrical characteristics thereof. It has been found that when the crystal is squeezed along the X axis thereof the frequency of oscillation increases with the compression of the crystal. When the crystal is stretched along the X axis the frequency will decrease. Therefore, variations of opposite sense take place with deformation along only one axis. When the crystal is compressed along the Z axis, the frequency decreases, and when it is stretched along the Z axis, the frequency increases. It has been found that crystals are less sensitive to deformation along the Z axis and therefore greater frequency deviation takes place by compressing or stretching along the X axis.

It is therefore apparent that in crystal filter circuits, the provision of adjustment of the frequency of a crystal by mechanical means makes it possible to easily align a filter structure and at the same time retain the sharp resonance characteristics provided by the crystal. This provides more effective filter structures since the adjustment can be easily and accurately accomplished. The structure required is relatively simple and is less expensive than the use of very accurate crystals. It further permits adjustment after the filter is assembled.

Although one embodiment of the invention has been shown which is illustrative thereof, it is obvious that various changes and modifications can be made therein within the intended scope of the invention as defined in the appended claims.

We claim:

1. A frequency controlling device for an electrical circuit including in combination, a flat crystal plate having a resonant frequency, electrodes coupled to the opposite major faces of said crystal plate for connection into the circuit, said crystal plate having an X-axis in the plane of said plate, the physical length of said crystal plate along said X-axis controlling the resonant frequency of said crystal plate, and the resonant frequency of said crystal plate changing with adjustment of the physical length of said crystal along said X-axis, and rigid mechanical means engaging said crystal plate at edges thereof and rigidly holding the same, said mechanical means being adjustable for changing the physical length of said crystal plate along said X-axis thereof and thereby changing the resonant frequency of said plate and the frequency controlling effect of the device.

2. A frequency controlling device for an electrical circuit including in combination, a flat circular crystal plate having a resonant frequency, electrodes coupled to the opposite major faces of said plate for connection in the circuit, said crystal plate having an X-axis in the plane of said plate, the physical length of said crystal plate along said X-axis controlling the resonant frequency of said crystal plate, and the resonant frequency of said crystal plate changing with adjustment of the physical length of said crystal plate along said X-axis, and rigid mechanical means for holding said crystal plate, said means having first and second relatively movable parts with curved jaws engaging said crystal plate at edges thereof, and adjustable means for controlling the relative positions of said parts for changing the physical length of said crystal plate along said X-axis and thereby changing the resonant frequency of said plate and the frequency controlling effect of the device.

3. A band pass filter circuit including at least two piezo-electric crystal devices resonant at different frequencies with the difference in the frequencies controlling the band pass of the circuit, at least one of said crystal devices including a flat circular crystal disc, a pair of electrodes coupled to the opposite major faces of said crystal disc, said crystal disc having an X-axis in the plane of said disc, the physical length of said crystal plate along said X-axis controlling the resonant frequency of the crystal disc, and crystal holder means including adjustable rigid mechanical means engaging said crystal disc at edges thereof, said mechanical means rigidly engaging said crystal disc and applying mechanical forces thereto for changing the physical dimension of said disc along said X-axis thereof, whereby adjustment of said mechanical means adjusts the resonant frequency of said one crystal device and also adjusts the difference in frequency of said crystal devices to control the band pass of the filter circuit.

4. In a band pass filter circuit including at least two piezo-electric crystals which are resonant at different frequencies, at least one of said crystals being a flat plate with an X-axis in the plane of the plate, the physical length of the crystal plate along the X-axis controlling the resonant frequency of the crystal, and with the band pass of the circuit depending on the difference of the frequencies of the crystals, the method of adjusting the band pass of the circuit including the steps of physical rigidly engaging the one crystal plate at opposite edges thereof, and applying mechanical force to the crystal plate to change the physical length thereof along the X-axis thereof, whereby the resonant frequency of said one crystal is changed to thereby change the difference in the resonant frequencies of the crystals and the band pass of the filter circuit.

References Cited in the file of this patent

UNITED STATES PATENTS

| | | |
|---|---|---|
| 1,632,150 | Sparkes | June 14, 1927 |
| 1,796,116 | Nicolson | Mar. 10, 1931 |
| 1,841,459 | Taylor | Jan. 19, 1932 |
| 1,866,267 | Nicolson | July 5, 1932 |
| 1,957,063 | Hansell | May 1, 1934 |
| 2,133,647 | Pierce | Oct. 18, 1938 |
| 2,240,293 | Goddard | Apr. 29, 1941 |
| 2,296,882 | Toth | Sept. 29, 1942 |
| 2,444,998 | Matthias | July 13, 1948 |

FOREIGN PATENTS

| | | |
|---|---|---|
| 860,729 | France | Oct. 7, 1940 |